United States Patent
Stuhlmann et al.

(10) Patent No.: US 10,858,194 B2
(45) Date of Patent: Dec. 8, 2020

(54) APPARATUS AND METHOD FOR FORMING PACKS

(71) Applicant: KHS GmbH, Dortmund (DE)

(72) Inventors: Christopher Stuhlmann, Korbach (DE); Karl-Heinz Klumpe, Kleve (DE); Stefan Wagner, Kleve (DE); Jörg Koppers, Uedem (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 16/500,355

(22) PCT Filed: Feb. 6, 2018

(86) PCT No.: PCT/EP2018/052849
§ 371 (c)(1),
(2) Date: Oct. 2, 2019

(87) PCT Pub. No.: WO2018/188831
PCT Pub. Date: Oct. 18, 2018

(65) Prior Publication Data
US 2020/0122930 A1   Apr. 23, 2020

(30) Foreign Application Priority Data
Apr. 10, 2017  (DE) .......................... 10 2017 107 609

(51) Int. Cl.
*B65G 21/14*    (2006.01)
*B65B 59/00*    (2006.01)
*B65G 21/10*    (2006.01)

(52) U.S. Cl.
CPC ............ *B65G 21/14* (2013.01); *B65B 59/003* (2019.05); *B65B 59/005* (2013.01); *B65G 21/10* (2013.01); *B65B 2210/02* (2013.01)

(58) Field of Classification Search
CPC .... B65G 21/10; B65G 21/14; B65G 2207/30; B65G 15/26; B65B 2210/02; B65B 59/005; B65B 59/003; B65B 11/58; B65B 35/30; B65B 59/04; B65B 59/00
USPC ................ 198/817, 860.1, 435, 860.2, 861.5
See application file for complete search history.

(56) References Cited

U.S. PATENT DOCUMENTS

| | | | |
|---|---|---|---|
| 4,499,988 A * | 2/1985 | Gasser ................ | B65G 47/647 198/369.2 |
| 4,643,299 A | 2/1987 | Calundan | |
| 6,868,958 B2 * | 3/2005 | Betti ........................ | B26D 3/16 198/418.7 |
| 7,699,158 B2 * | 4/2010 | Aust .................... | B65G 47/643 198/435 |

(Continued)

FOREIGN PATENT DOCUMENTS

| | | |
|---|---|---|
| DE | 102010050524 | 5/2012 |
| DE | 102016205255 | 10/2017 |

(Continued)

*Primary Examiner* — James R Bidwell
(74) *Attorney, Agent, or Firm* — Occhiuti & Rohlicek LLP

(57) ABSTRACT

An apparatus for forming packs from multiple packaging units includes three transporters, a deflector, and an exchange transporter having no more than one transport segment. A gap exists between the first transporter and the third transporter. Either the exchange transporter or the second transporter is in the gap. Movement of the deflector adjusts a lineal dimension of the gap so as to accommodate insertion of the exchange transporter.

19 Claims, 3 Drawing Sheets

(56) References Cited

U.S. PATENT DOCUMENTS

| | | | |
|---|---|---|---|
| 9,394,113 B2* | 7/2016 | Werner | B65B 65/003 |
| 2004/0118086 A1* | 6/2004 | Cere | B65B 11/105 53/449 |
| 2007/0022715 A1 | 2/2007 | Wegner et al. | |
| 2007/0187211 A1 | 8/2007 | Vertogen et al. | |
| 2012/0023866 A1 | 2/2012 | Rabec | |
| 2012/0298484 A1 | 11/2012 | Gadliger | |
| 2013/0199899 A1 | 8/2013 | Biggel | |
| 2013/0220774 A1* | 8/2013 | Werner | B65B 59/00 198/583 |
| 2015/0144536 A1 | 5/2015 | Dugat | |

FOREIGN PATENT DOCUMENTS

| | | |
|---|---|---|
| EP | 1223105 | 7/2002 |
| JP | H02127207 | 5/1990 |

* cited by examiner

APPARATUS AND METHOD FOR FORMING PACKS

RELATED APPLICATIONS

This application is the national stage under 35 USC 371 of international application PCT/EP2018/052849, filed on Feb. 6, 2018, which claims the benefit of the Apr. 10, 2017 priority date of German application DE 10 2017 107 609.3, the contents of which are herein incorporated by reference.

FIELD OF INVENTION

The invention relates to forming packs from multiple packages.

BACKGROUND

A variety of devices for forming packs are known. These devices typically bring formed pack to a shrink tunnel so that a shrink film can keep the pack together.

In some case, the packages, such as bottles or cans, that form the pack sometimes rest on cardboard. In other cases, they do not. This distinction requires reconfiguration such a device between two operating modes. Such reconfiguration can be inconvenient.

SUMMARY

A disadvantage of the prior art is that converting an apparatus from one operating mode to another remains an elaborate procedure that takes a great deal of time. This leads to long downtimes.

An object of the invention is that of providing a pack-forming apparatus that can form packs from multiple packages and that can be converted easily from one operating mode to another.

According to a first aspect, the invention relates to an apparatus for the forming packs from multiple packages.

The apparatus comprises a first transporter, a second transporter following the first transporter in the transport direction, and a third transporter following the second transporter in the transport direction. The apparatus includes an exchange transporter. This exchange transporter consists of a single conveying segment. It does not have multiple segments arranged behind one another.

The exchange transporter is insertable between the first and third transporters. To accommodate such insertion, it is possible to either change the length of the exchange transporter or the width of the gap between the first transporter and the third transporter. This change is carried out by translating a deflector.

An advantage of the device arises from the ease with which the exchange transporter can be inserted by translational shifting of at least one deflector of the exchange transporter or of the first or of the third transporter. This arises because the gap into which it is inserted can be temporarily widened. In some embodiments, the first or the third transporter can comprise one or more thrust plates on which the packs are to be transported or the packages, which form the later packs, or groups of packages, can be made to slip or slide in the transport direction by motor-driven thrust rods.

In some embodiments, one or more of the exchange transporter, the first transporter, and the third transporter comprises a rotating transport element that rotates at least at two of the deflectors that define the conveying length of these transporter. A distance, measured in the transport direction, between the deflectors of the exchange transporter,] the first transporter, or the third transporter can be altered. The conveying length is the length of the transport segment on which the packages or packs respectively are conveyed through the respective transporter. With a belt conveyor, a deflector arranged at a free end of the conveyor promotes transport of packages to the next transporter as seamlessly as possible and as free as possible from vibrations. Due to the translational shifting of these free-end deflectors, it is possible to vary either the length of the exchange transporter or the width of the gap between the first transporter and the third transporter. This makes conversion between operating modes easier and also reduces the time required for such conversion.

In some embodiments, the location of one of the deflectors relative to another deflector can be altered by translating or shifting the deflector parallel to the transport direction. In the case of the exchange transporter, the first transporter, or the third transporter, it is possible to relocate one of at least two deflectors that define the conveying length to another location along the transport direction. As a result, it is possible to reduce the length measured in the conveying direction of the exchange transporter, the first transporter, or the third transporter. This makes installation easier by widening the gap between the first and third transporters or by reducing the exchange transporter's length.

In some embodiments, a deflector arranged on either the first or third transporter and adjacent to the exchange transporter can be relocated parallel to the transport direction. These deflectors, hereafter referred to as the "adjacent deflectors," deflect the transport element in a transitional region in which the packages or packs are conveyed to the exchange transporter or conveyed away from the exchange transporter.

In particular, the first transporter's adjacent deflector can be displaced during the converting procedure in a direction that is opposite to the transport direction and the third transporter's adjacent deflector can be displaced along the transport direction.

In alternative embodiments, the deflectors are instead pivoted out of the transport path at least partially in place of being translated.

In either case, whether as a result of translation or pivoting, the end result is an enlargement of the width of the gap between the first and third transporters.

Some embodiments feature drive units for shifting deflectors. Examples of such drive units include electrical, pneumatic, or hydraulic drives. However, in other embodiments, shifting deflectors is carried out manually, for example by a manually-actuated adjustment mechanism.

In some embodiments, a drive for the translational shifting of the exchange transporter's deflector is provided at the exchange transporter itself. In other embodiments, such a drive is at a stationary location, such as a machine frame. In either case, the drive can be coupled during insertion of the exchange transporter, the drive unit to transfer drive forces.

Embodiments include those in which the drive is a constituent part of the exchange transporter and is lifted or lowered together with the exchange transporter.

In other embodiments, the drive is not a constituent part of the exchange transporter. Instead, the drive is only coupled to the drive when converting to the second operating mode. Such a temporary coupling can be effected in a variety of ways, including but not limited mutual engagement of toothed wheels or by some other means of coupling the drive to an adjustment mechanism provided at the exchange transporter.

Some embodiments include guide elements at one or more of the transporters. These operate to guide the rotation axis of a deflector during its translation. Examples of such guide elements include those that guide a shaft that defines a deflector's rotation axis along a non-displaceable carrying structure that carries the shaft. Other guide elements are those that guide movement of a carrying structure that carries such a shaft. These different guide elements can coexist in combination within the same apparatus.

In an alternative embodiment, one or more transporters includes a tensioning device that causes tension in the transporter. The tensioning device maintains tension even as the deflector translates or shifts. This avoids or reduces the incidence of undesirable slippage of the transport element.

Yet other embodiments feature a lift that raises or lowers the exchange transport device. In some embodiments, the lift not only raises or lowers the exchange transport device but also holds it offset from the transport plane during the first operating mode when it is not in use. The offset can be such that the exchange transport device is held below or above the transport plane when not in use.

Other embodiments feature a lift that also tilts the exchange transport device into an oblique orientation while raising or lowering it. In this configuration, the transport plane defines a horizontal axis and the exchange transport device defines an oblique axis that makes an angle with the horizontal axis. Embodiments include those in which this angle varies up to thirty degrees from the horizontal plane.

The ability to tilt the exchange transporter into an oblique orientation means that one free end of the exchange transporter can be positioned lower than the other free end. This makes it easier to introduce the exchange transporter into the gap between the first and third transporters.

In an alternative embodiment, the first and third transporters are tilted into an oblique orientations so that a transport plane formed by that transporter forms an angle relative to the horizon. The oblique orientation permits a deflector adjacent to the gap into which the exchange transporter is to be introduced to move up or down effectively enlarging that gap by a factor that depends on the sine or cosine of the angle of that transport plane relative to the horizontal.

Some embodiments feature moving the second transporter from a first position, in which it transports packages, into a second position, in which it is no longer active. Among these are embodiments in which the second transporter is moved laterally. Also among these are embodiments in which the second transporter is shifted in a direction transverse to the transport direction. In either case, the result is to create a gap for the exchange transporter to fit into.

Embodiments also include those in which the second transporter is made of plural transporter sections. In such embodiments, these transporter sections can be disconnected and moved in opposite directions transverse to the transport direction to achieve the second position in which the second transporter, now disassembled, is inactive.

In another aspect, the invention features an apparatus for forming packs from multiple packages with the apparatus including a second transporter arranged between a first transporter and a third transporter. An exchange transporter, which consists of only a single conveying segment, which can be used to replace the second transporter. The exchange transporter's length can be altered by a shifting a deflector.

In some embodiments, a lift holds the exchange transporter in such a way as to be able to tile the exchange transporter during insertion thereof. As a result of this tilt, exchange transporter's longitudinal axis runs transverse to a horizontal plane.

In a further aspect, the invention relates to a method for converting a device that comprises a first transporter, a second transporter following the first transporter in the transport direction, and a third transporter following the second transporter in the transport direction. In this device, there exists an exchange transporter that consists of one single conveying segment. During the conversion process, the exchange transporter replaces the second transporter. Doing so includes inserting it between the first and third transporter. Prior to insertion, a length adjustment takes place. This length adjustment is either an adjustment to the exchange transporter's length or an adjustment to the width of a gap between the first transporter and the third transporter through translation or shifting of one or more deflectors.

As used herein, the term "package" refers to containers for receiving goods, such as cans, bottles, pouches, etc.

As used herein, "pack" refers to a group of packages that have been grouped together to form a package group that is capable of being handled as a unit, with the packages having been bound together by a binding means, such as a film. A group of packages will sometimes be referred to herein as a "package group."

As used herein, "transporter" refers to a structure that conveys packages or packs, in particular transport bands or belts, transport chains, including bands and belts that are made from elements that have been connected together by joints.

As used herein, "deflector" refers to structures that deflect a conveyor and that can be driven to rotate. A deflector can be configured as a roller.

As used herein, "essentially" or "approximately" refer to deviations from an exact value by ±10%, preferably by ±5%, or deviations in the form of changes that are not of significance for the function.

As used herein, the conjunction "or" is not an exclusive "or" unless indicated.

Further embodiments, advantages, and possible applications of the invention also derive from the following description of exemplary embodiments and from the figures. In this context, all the features described or represented in image form are in principle the object of the invention, alone or in any desired combination, regardless of their relationship in the claims or reference to them. The contents of the claims are also deemed a constituent part of the description.

BRIEF DESCRIPTION OF THE DRAWINGS

These and other features of the invention will be apparent from the following detailed description and the accompanying figures, in which.

DETAILED DESCRIPTION

Figure 1:
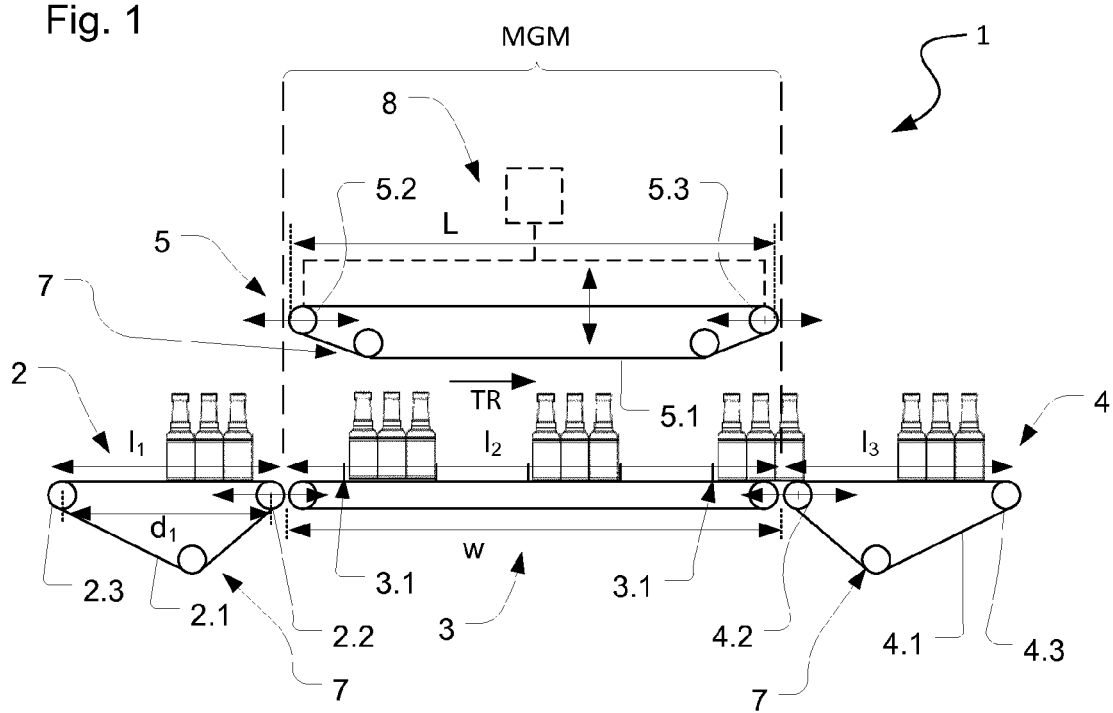
FIG. 1 shows a side view of a packer operating in a first operating mode.

FIG. 1 shows a packer 1 that forms packs from multiple packages. The packer 1 includes a first transporter 2, a second transporter 3, and a third transporter 4 that follow each other along a transport direction TR. The first, second, and third transporters 2, 3, 4 have corresponding first, second, and third conveying lengths l1, l2, l3.

The first transporter 2 conveys package groups to the second transporter 3. The second transporter 3 conveys package groups through a machine base module MGM at which a series of processing steps is carried out on the package groups. The third transporter 4 conveys packages from the second transporter 3 to a processing location, such as a shrink-film tunnel.

The packer 1 further comprises an exchange transporter 5 that can be swapped into position between the first and third transporters 2, 4, thus replacing the second transporter 3. As a result, it is possible to modify the packer 1 to operate in different operating modes that produce different types of packs. Among these operating modes are a first operating mode and a second operating mode.

In the first operating mode, the second transporter 3 conveys package groups. The packages stand upright on a cardboard sheet. The second transporter 3 includes a pair of circulating transport chains that are arranged at a distance from each other. As the package groups stand upright on the transport chains, the transport chains convey them along the transport direction TR.

In some embodiments, the second transporter 3 comprises folding devices 3.1 that fold peripheral sections of the cardboard sheet. When folded, these sections project upwards from the transport plane of the second transporter 3. Among these embodiments are those in which upwardly projecting folding tools form the folding devices 3.1.

In some cases, the packages stand upright but by themselves rather than on a cardboard sheet. To accommodate these cases, it is useful to adjust the packer 1 in a way that causes the exchange transporter 5, rather than the second transporter 4, to convey package groups.

The exchange transporter 5 relies on one or more transport bands or belts that run parallel to the transport direction TR. In an alternative configuration of the packer 1, the exchange transporter 5 replaces the second transporter 3 along the transport path. As such, it takes over the task of conveying package groups between the first transporter 2 and the third transporter 4. This reconfiguration requires inserting the exchange transporter 5 into the space occupied by the second transporter 3. This space, which is between the first and third transporters 2, 4 and has a width w, will be referred to herein as a "gap."

Some embodiments feature a lift 8 that brings the exchange transporter 5 into the gap. The lift 8 raises or lowers the exchange transporter 5 vertically, as indicated by the double arrow in FIG. 1. Embodiments of the lift 8 include a crane, a cable pull, and a chain pull, as well as equivalents thereof.

To promote the ease with which the exchange transporter 5 is inserted into the gap, it is useful to alter either the length L of the exchange transporter 5 along the transport direction TR or the gap's width.

As one example, shortening the first and third conveying lengths l1, l3 of the first and third transporters 2, 4 will increase the gap w, thus making insertion of the exchange transporter 5 simpler. Conversely, reducing the length L or the second conveying length l2 of the exchange transporter 5 has a similar effect and thus eases the task of inserting the exchange transporter 5.

In the example of FIG. 1, a transport band or belt forms the transport element 2.1. The transport band or belt runs around first and second deflectors 2.2, 2.3 and a tensioning device 7. In the examples shown in FIG. 1, the first deflector 2.2 is that closest to the gap.

One way to enlarge the gap is to reduce the first conveying length l1, i.e. the distance between the first and second deflector 2.2, 2.3. In some embodiments, reducing the distance takes place preferably by translating the rotation axis of the first deflector 2.2 parallel to the transport direction TR and towards the second deflector 2.3.

To carry out this translation, it is useful to provide a guide that extends in the transport direction TR. This guide guides a shaft that forms the first deflector's rotation axis. The actual shifting can be carried out manually or by a drive unit, such as an electrical, hydraulic, or pneumatic drive unit.

In an analogous manner, a transport band or belt forms the transport element 4.1. The transport band or belt runs around a first deflector 4.2, a second deflector 4.3, and a tensioning device 7.

One way to enlarge the gap is to reduce the third conveying length l3, i.e. the distance between the first and second deflector 4.2, 4.3. This can be carried out in conjunction with the method described above that involves altering the first conveying length l1.

In some embodiments, translating a rotation axis along the transport direction TR reduces the distance between the first and second deflector 4.2, 4.3. A suitable rotation axis is that of the first deflector 4.2. This would be the deflector closer to the gap. In these embodiments, a shaft that forms the first deflector's rotation axis is displaceable along a guide element that extends in the transport direction TR. The motive force required to translate the shaft can be provided manually or by a drive unit, such as an electrical, hydraulic, or pneumatic drive unit.

In some embodiments, the exchange transporter 5 has a variable length L as a result of a variable second conveying length l2. To change this length, deflectors 5.2, 5.3 associated with the exchange transporter 5 are translated or displaced along the transport direction TR. The deflectors 5.2, 5.3 are located such that, after the insertion of the exchange transporter 5, they are arranged between the first and third transporters 2, 4 and adjacent to the first and third transporters 2, 4, respectively.

To achieve this translation, shafts that form the rotation axes of the deflectors 5.2, 5.3 are guided either along a guide that extends along the transport direction TR or along a carrying structure that bears the deflectors 5.2, 5.3 and that has an adjustable length. The motive force required to translate the deflectors 5.2, 5.3 can be carried provided manually or by a drive, such as an electrical drive, a hydraulic drive, or a pneumatic drive.

Figure 2:
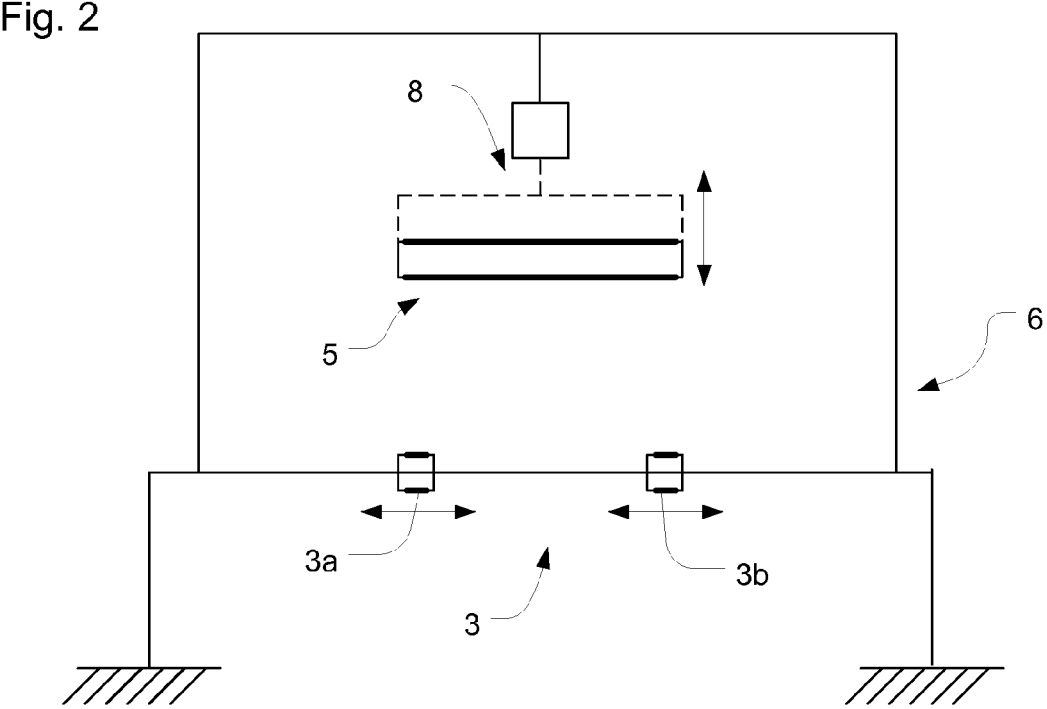
FIG. 2 shows an end view of the packer shown in FIG. 1.

FIGS. 1 and 2 show the configuration of the packer 1 in its first operating mode. In this first operating mode, the second transport unit 3 conveys the packages. The exchange transporter 5 is mounted out of the way above the second transport unit 3 after having been raised by the lift 8. In some embodiments, a support or a securing device holds the exchange transporter 5 in position.

Converting the packer 1 from operating in the first operating mode into operating in the second operating mode begins by moving the second transport unit 3 to create space for inserting the exchange transporter 5 instead.

Referring to FIG. 2, the second transport unit 3 includes first and second transporter sections that can be implemented using first and second transport chains 3a, 3b that extend parallel to each other along the transport direction TR. As shown in FIG. 2, a vertical separation plane that extends in the transport direction TR separates the first and second transport chains 3a, 3b.

Figure 3:
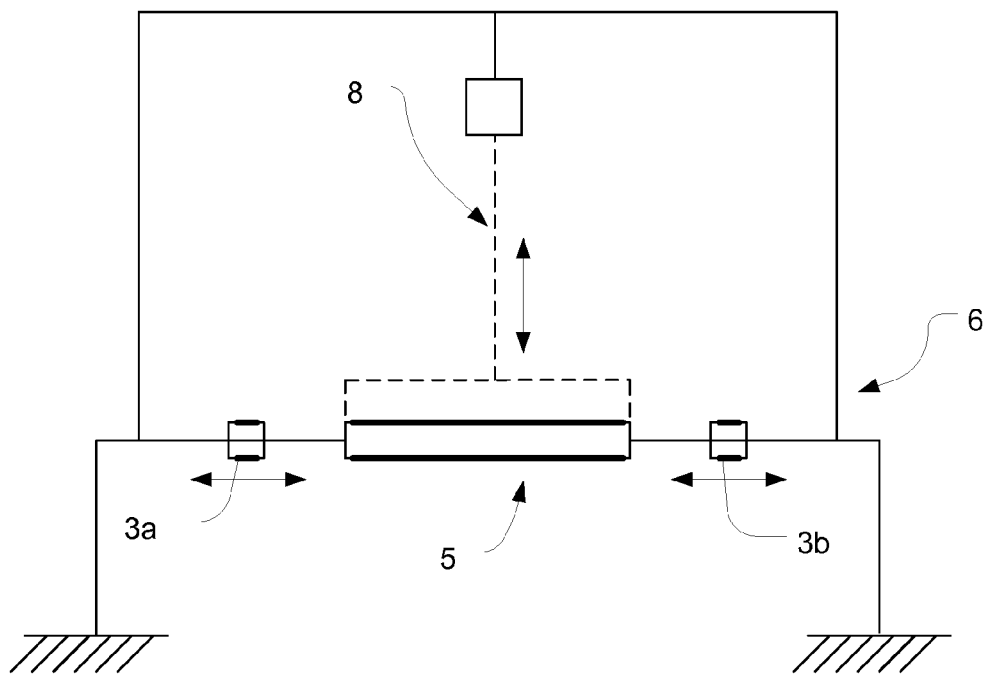
FIG. 3 shows an end view of the packer from FIGS. 1 and 2 during a conversion from the first operating mode to a second operating mode.

As suggested by the double arrows in FIG. 2, the transport chains 3a, 3b can be moved apart or together along a direction that is perpendicular to the transport direction TR. As indicated by the double arrow in FIG. 2, it is possible to move the transporter sections 3a, 3b apart from one another. This allows the transport chains 3a, 3b to be moved outward into an inactive position, as shown in FIG. 3. As a result, the lift 8 can lower the exchange transporter 5 for insertion between the transport chains 3a, 3b, as shown in FIGS. 3 and 4.

Figure 4:
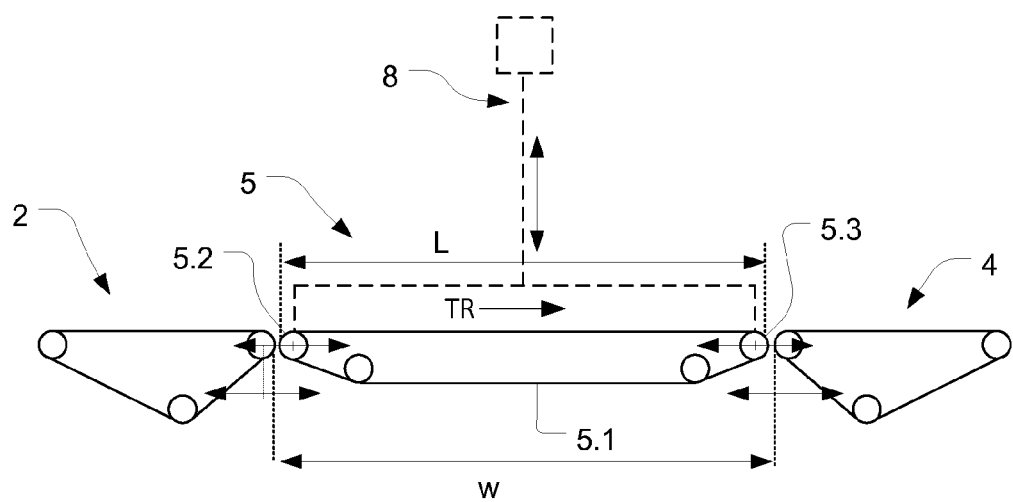
FIG. 4 shows a side view of the packer show in FIG. 3.

Prior to carrying out the insertion shown in FIGS. 3 and 4, some accommodation should already have been made for the dimensions along the transport direction TR. For example, a change in the length of the exchange transporter 5 would already have been carried out or the enlargement of the gap's width w will already have taken place.

Once the exchange transporter has been inserted, it may be found that the gap is wider than needed or that the length has been reduced more than necessary. With the exchange transporter 5 safely in place, the adjustments that were made to accommodate insertion can partially reversed to reduce, as much as possible, the gaps between the first transporter 2 and the exchange transporter 5 and between the exchange transporter 5 and the third transporter 4. Partial reversal can be carried out in a variety of ways, such as by increasing the length of the exchange transporter 5 even up to its original length or by reducing the width w of the gap to its original size if necessary.

Figure 5:
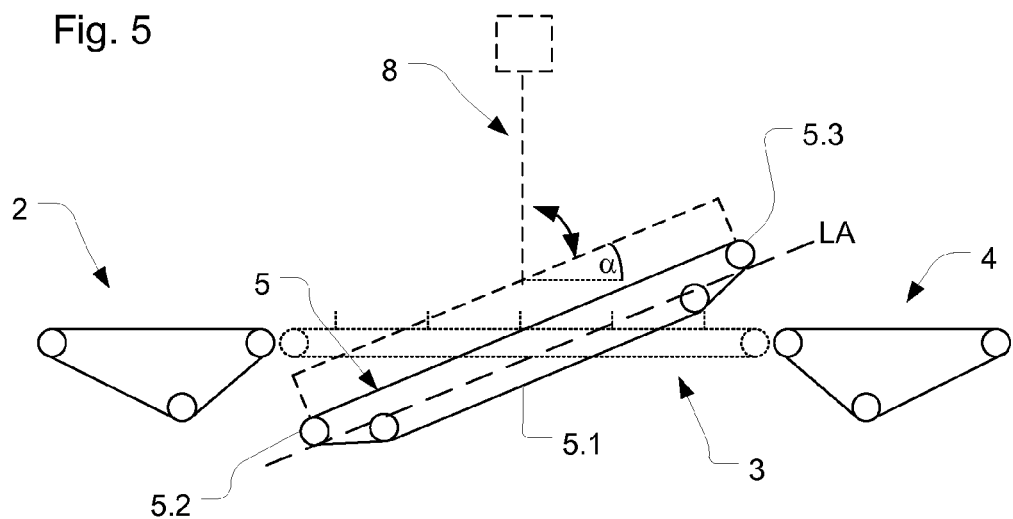
FIG. 5 shows a side view of a packer during conversion from a first operating mode to a second operating mode with an obliquely-arranged exchange transporter.

FIG. 5 shows an embodiment that further eases the task of introducing the exchange transporter 5. In the embodiment of FIG. 5, the lift 8 orients the exchange transporter 5 so that its longitudinal axis LA is oblique rather than horizontal. The oblique axis and the horizontal axis thus enclose an acute angle α.

When lowering an exchange transporter 5 that has been tilted into an oblique orientation, it becomes possible to bring one lower free end of the exchange transporter 5 beneath a transverse element of a machine frame and to then return it to a horizontal plane while further lowering the exchange transporter 5. The oblique orientation of the exchange transporter 5 is also useful when raising the exchange transporter 5 into the upper position.

Figure 6:
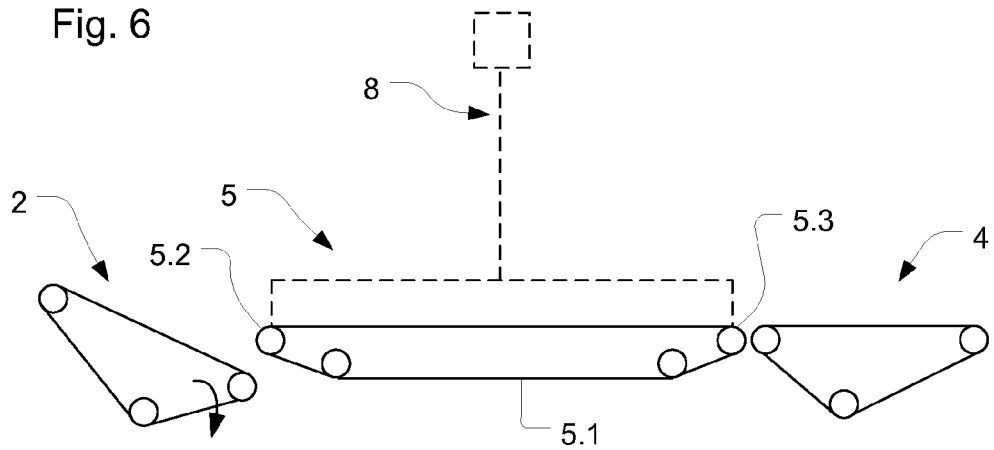
FIG. 6 shows a side view of a packer 1 during conversion from a first to a second operating mode with an obliquely-arranged first transporter.

As an alternative or in addition to the embodiment shown in FIG. 4, it is also possible to orient the transporters 2, 4 obliquely, as shown in FIG. 6. In particular, after having been tilted into oblique orientations, the first deflector 2.2 of the first transporter 2 or the first deflector 4.2 of the third transporter 4 can be pivoted downwards or upwards. This further enlarges the gap between the transporters 2, 4 and further eases the insertion of the exchange transporter 5.

Having described the invention and a preferred embodiment thereof, what is new and secured by Letters Patent is:

1. An apparatus for forming packs from packaging units, said apparatus comprising a first transporter, a second transporter, a third transporter, and an exchange transporter, all of which convey packaging units, along a transport direction, between said first transporter and said third transporter, wherein said exchange transporter consists of at most a single conveying segment, said apparatus further comprising a deflector, wherein there exists a gap, wherein, during operation, at most one transporter is within said gap, wherein said transport is selected from the group consisting of said exchange transporter and said second transporter, wherein movement of said deflector adjusts a lineal dimension to accommodate insertion of said exchange transporter, wherein said adjustment is selected from the group consisting of adjustment of a length of said exchange transporter and adjustment of said gap, wherein said movement is selected from the group consisting of a translational shift and a pivot, wherein a transporter, which is selected from the group consisting of said first transporter, said second transporter, and said exchange transporter, comprises guide elements, wherein said deflector comprises a shaft that defines a rotation axis of said deflector, wherein said deflector deflects movement of said transporter, and wherein, during said adjustment, said guide elements guide movement of said shaft.

2. The apparatus of claim 1, wherein a transporter, which is selected from the group consisting of said first transporter, said second transporter, and said exchange transporter, comprises a circulating transport element that comprises first and second deflectors, said first and second deflectors being separated by an adjustable length.

3. The apparatus of claim 2, wherein said first and second deflectors are configured to be shifted along said transport direction to adjust said length.

4. The apparatus of claim 2, wherein said first and second deflectors are configured to be pivoted to adjust said length.

5. The apparatus of claim 1, wherein a transporter, which is selected from the group consisting of said first transporter, said second transporter, and said exchange transporter, comprises a circulating transport element that comprises a pair of deflectors, said pair of deflectors comprising first and second deflectors that are displaceable along said transport direction.

6. The apparatus of claim 5, wherein said pair of deflectors is a constituent of said first transporter or said third transporter.

7. The apparatus of claim 1, further comprising drive units for causing said movement.

8. The apparatus of claim 7, wherein said drive is provided at said exchange transporter.

9. The apparatus of claim 7, wherein said drive is provided on a stationary machine frame such that, upon insertion thereof, said exchange transporter couples to said drive.

10. The apparatus of claim 1, wherein a transporter, which is selected from the group consisting of said first transporter, said second transporter, and said exchange transporter, comprises a circulating transport element that is under tension.

11. The apparatus of claim 1, further comprising a lift for raising and lowering said exchange transporter.

12. The apparatus of claim 11, wherein said lift is configured to tilt said exchange transporter into an oblique orientation in which a longitudinal axis of said exchange transporter makes a non-zero angle with a horizontal plane.

13. The apparatus of claim 12, wherein said angle is at least thirty degrees.

14. The apparatus of claim 1, wherein said second transporter is configured to move from a first position to a second position when being replaced by said exchange transporter, wherein said first position is an active position in which said second transporter conveys packages, and wherein said second position is an inactive position in which said second transporter is idle.

15. The apparatus of claim 1, wherein said second transporter is configured to be disassembled when being replaced by said exchange transporter at an active position where conveying takes place and wherein said second transporter comprises transporter sections that are moved in different directions when said exchange transporter replaces said second transporter in said active position.

16. The apparatus of claim 1, wherein a transporter, which is selected from the group consisting of said first transporter and said third transporter, comprises thrust plates on which packages are able to slide in said transport direction in response to a motor-drive thrust element.

17. An apparatus for forming packs from packages, said apparatus comprising a second transporter and an exchange transporter, wherein said second transporter is configured for arrangement between a first transporter and a third transporter, wherein said exchange transporter consists of one single conveying segment, wherein said exchange transporter is configured to be inserted between said first and third transporter to replace said second transporter, wherein a length of said exchange transporter is adjustable by carrying out an act selected from the group consisting of causing translation of a deflector unit and holding said exchange transporter with a lift so as to tilt said exchange transporter while said exchange transporter is being inserted, and wherein said tilt causes a longitudinal axis of said exchange transporter to form an angle relative to a horizontal plane.

18. A method for converting an apparatus that comprises a first transporter, a second transporter, a third transporter, and an exchange transporter, wherein a gap exists between said first and third transporters along a transport direction, wherein said exchange transporter comprises at most a single conveying segment, wherein said method comprises replacing said second transporter in said gap with said exchange transporter, wherein replacing comprises moving said deflector to cause an adjustment of a lineal dimension, wherein said adjustment is selected from the group consisting of adjustment of a length of said exchange transporter and adjustment of said gap, and wherein moving is selected from the group consisting of a translational shifting and a pivoting.

19. The method of claim 18, further comprising using motor driven thrust plates on one of said first and third transporters to cause said packs or said packaging units to be slipped or slid in said transport direction.

\* \* \* \* \*